United States Patent [19]
Petrosky et al.

[11] Patent Number: 5,044,509
[45] Date of Patent: Sep. 3, 1991

[54] INFANT NURSING BOTTLE AND LUMINESCENT INDICATOR

[76] Inventors: Thomas Petrosky; Paula A. Petrosky, both of 7433 Oregon Trail, Youngstown, Ohio 44512

[21] Appl. No.: 443,005

[22] Filed: Nov. 29, 1989

[51] Int. Cl.$^5$ .............................. A61J 9/00; A61J 9/08
[52] U.S. Cl. ................................... 215/366; 215/11.1; 215/11.6; 73/293; 362/34; 362/101; 250/483.1; 116/227
[58] Field of Search ..................... 215/365–367, 215/11.1, 11.2, 11.6, 11.3; 446/219; 250/483.1; 362/34, 101; 73/293, 299, 302; 316/227, DIG. 1, DIG. 32

[56] References Cited

U.S. PATENT DOCUMENTS

| | | | |
|---|---|---|---|
| 745,942 | 12/1903 | Wickins | 250/463.1 X |
| 1,032,610 | 7/1912 | Kern | 215/367 X |
| 1,380,344 | 6/1921 | Bassett | 362/34 X |
| 2,663,866 | 12/1953 | Simpson | 362/101 X |
| 3,105,324 | 10/1963 | Friedman | 215/11.3 X |
| 3,245,174 | 4/1966 | Gardel et al. | 215/11.3 X |
| 3,584,211 | 6/1971 | Rauhut | 362/34 |
| 3,781,536 | 12/1973 | Naeseth | 362/34 |
| 4,086,723 | 5/1978 | Strawick | 362/34 X |
| 4,392,184 | 7/1983 | Hearold et al. | 362/101 |
| 4,732,035 | 3/1988 | Lagergren et al. | 73/293 X |

FOREIGN PATENT DOCUMENTS

| | | | |
|---|---|---|---|
| 943506 | 3/1974 | Canada | 215/365 |
| 1288116 | 12/1962 | France | 116/227 |
| 2485760 | 12/1981 | France | 215/365 |

*Primary Examiner*—Sue A. Weaver
*Attorney, Agent, or Firm*—Leon Gilden

[57] ABSTRACT

An apparatus is set forth including an outer, cylindrical shell formed with a tapered upper end defining an upper opening therethrough for receiving a nursing bottle of predetermined length equal to the axial length of the shell. A plurality of diametrically opposed conduits are intergrally affixed to opposed interior side walls of the shell aligned with fluid indicia formed on an exterior surface of the shell. A chemi-luminescent fluid is contained within a base pouch, the base pouch includes a plurality of spaced arms for reception within the diametrically opposed conduits with a threaded cap secured to a lowermost end of the shell. Remaining nursing fluid within a nursing bottle displaces the chemi-luminescent fluid within the pouch and directs said fluid upwardly for indication of remaining nursing fluid within the nursing bottle based on weight displacement of the nursing bottle on the chemi-luminescent fluid.

5 Claims, 4 Drawing Sheets

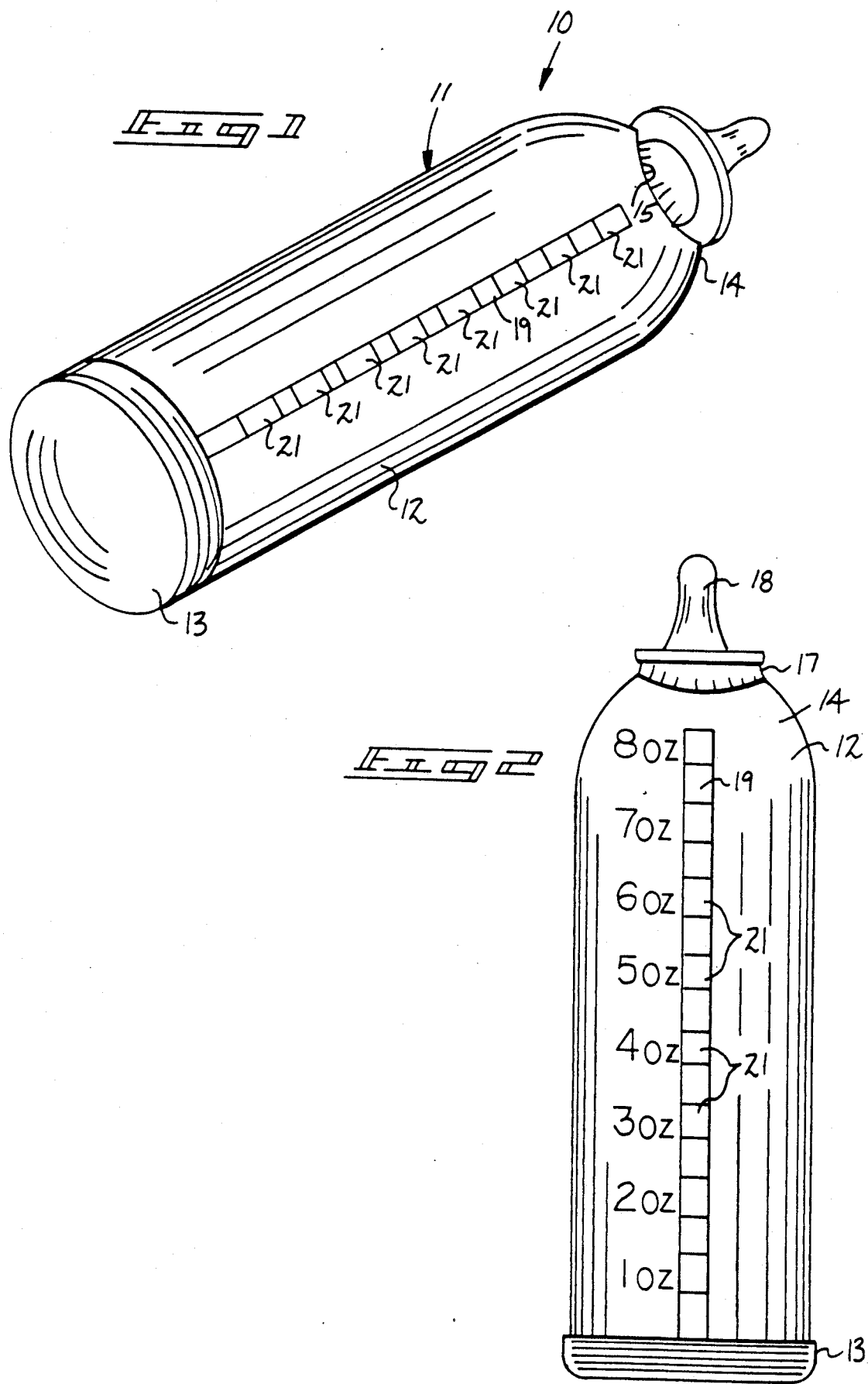

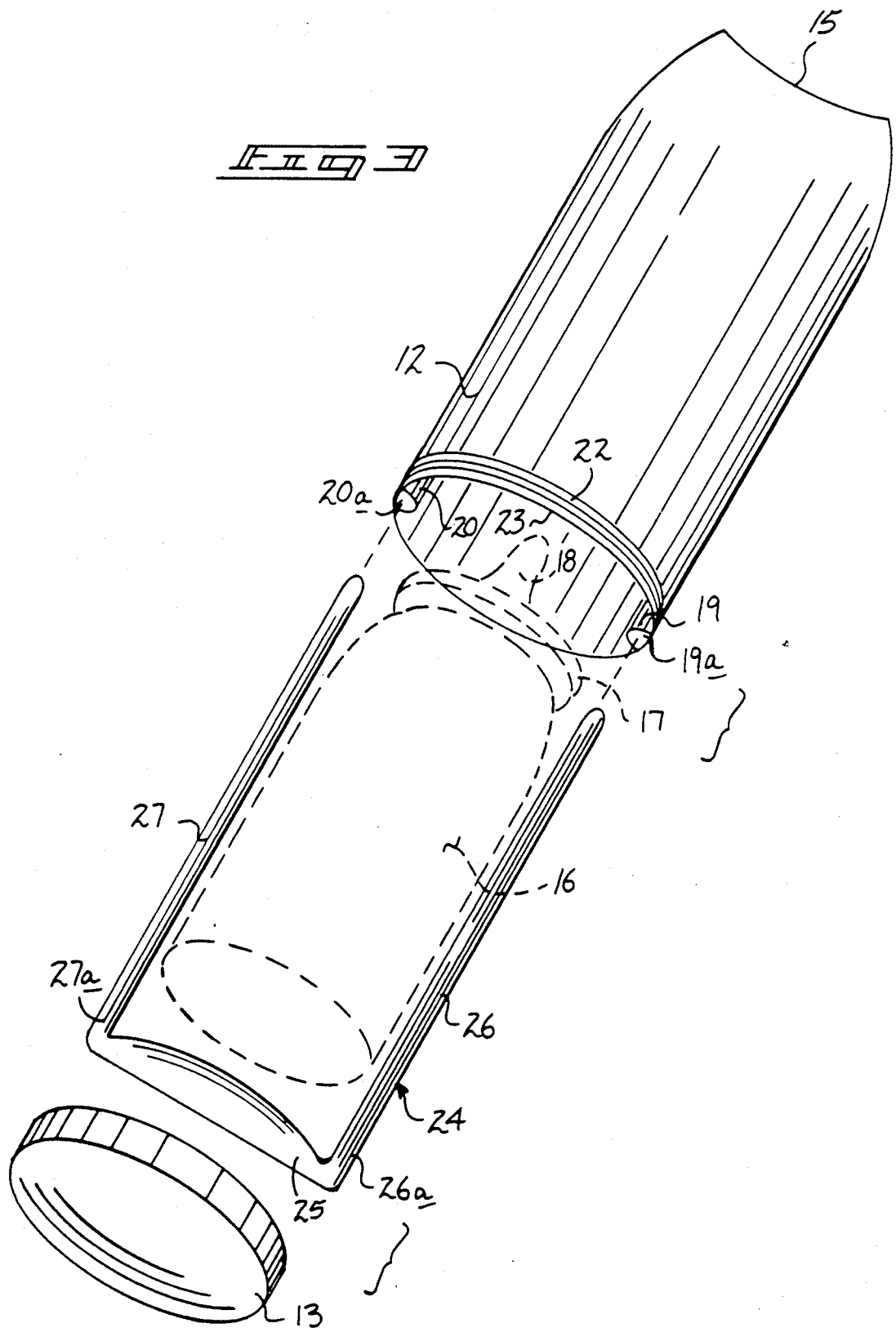

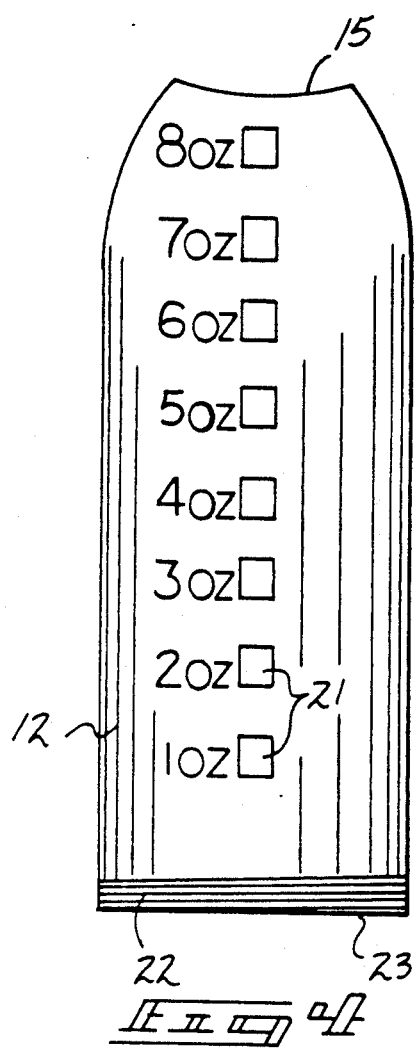
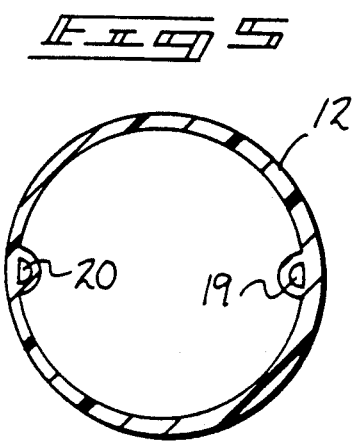

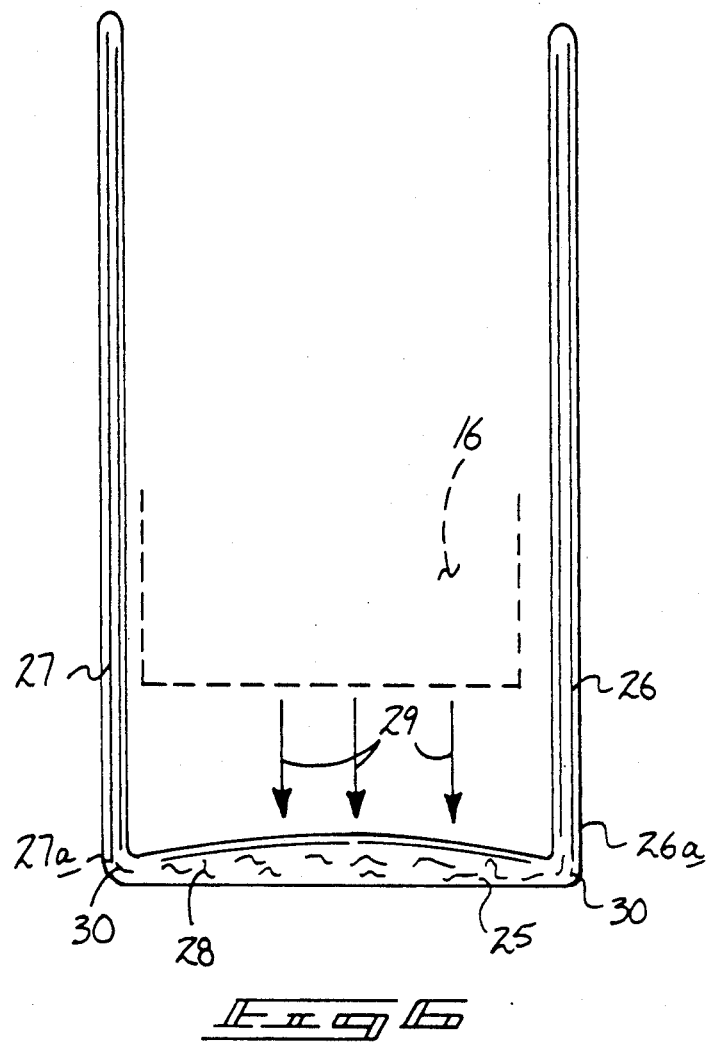
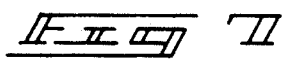
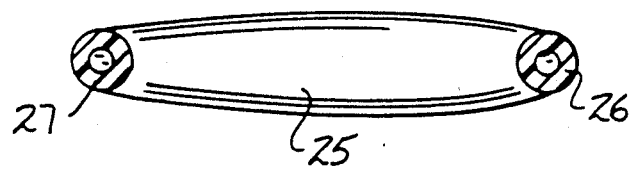

INFANT NURSING BOTTLE AND LUMINESCENT INDICATOR

BACKGROUND OF THE INVENTION

1. Field of the Invention

The field of invention relates to nursing apparatus, and more particularly pertains to a new and improved infant nursing bottle including luminescent indicator portions for indication of remaining fluid within a nursing bottle during periods of limited available light.

2. Description of the Prior Art

The use of nursing apparatus is well known in the prior art. During infant feeding during night time hours, it is undesirable to actuate lighting in a child's bedroom needlessly awaking the child and prolonging its waking time and unnecessarily prolonging an adult's required attention to such a child. The instant invention attempts to overcome deficiencies of the prior art to provide visual indication of remaining fluid within a nursing bottle during such limited light periods. Examples of the prior art include U.S. Pat. No. 1,380,344 to Bassett providing a pocket light provided with luminescent material therewithin for providing an available source of artificial light as required by an individual.

U.S. Pat. No. 4,086,723 to Btrawick provides a toy member including a chemi-luminescent material for illumination of the toy during use without generating heat.

U.S. Pat. No. 3,584,211 to Rauhut sets forth a liquid dispensing container with provision for dispensing of the chemi-luminescent material therewithin.

U.S. Pat. No. 1,032,610 to Kern sets forth a container bottle for typically containing a poison liquid therewithin formed with a luminescent chemical contained within the walls of the bottle for preventing inadvertent use of the bottle by an individual as an alert to such individual of the contents of the bottle.

U.S. Pat. No. 3,781,536 to Naeseth provides a diver's slate formed with a chemi-luminescent material for providing artificial light in use where limited light conditions prevail.

As such, it may be appreciated that there is a continuing need for a new and improved infant nursing bottle and luminescent indicator organization as set forth by the instant invention which addresses both the problems of ease of use and effectiveness in organization, and in this respect, the present invention substantially fulfills this need.

SUMMARY OF THE INVENTION

In view of the foregoing disadvantages inherent in the known types of nursing apparatus now present in the prior art, the present invention provides an infant nursing bottle and luminescent indicator wherein the same provides luminescent indication of remaining fluid within a nursing bottle during periods of limited light availability. As such, the general purpose of the present invention, which will be described subsequently in greater detail, is to provide a new and improved infant nursing bottle and luminescent indicator which has all the advantages of the prior art nursing apparatus and none of the disadvantages.

To attain this, the infant nursing bottle and luminescent indicator organization of the instant invention essentially comprises an apparatus including an outer, cylindrical shell formed with a tapered upper end defining an upper opening therethrough for receiving a nursing bottle of predetermined length equal to the axial length of the shell. A plurality of diametrically opposed conduits are integrally affixed to opposed interior side walls of the shell aligned with fluid indicia formed on an exterior surface of the shell. A chemi-luminescent fluid is contained within a base pouch, the base pouch includes a plurality of spaced arms for reception within the diametrically opposed conduits with a threaded cap secured to a lowermost end of the shell. Remaining nursing fluid within a nursing bottle displaces the chemi-luminescent fluid within the pouch and directs said fluid upwardly for indication of remaining nursing fluid within the nursing bottle based on weight displacement of the nursing bottle on the chemi-luminescent fluid.

My invention resides not in any one of these features per se, but rather in the particular combination of all of them herein disclosed and claimed and it is distinguished from the prior art in this particular combination of all of its structures for the functions specified.

There has thus been outlined, rather broadly the more important features of the invention in order that the detailed description thereof that follows may be better understood and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved infant nursing bottle and luminescent indicator which has all the advantages of the prior art nursing apparatus and none of the disadvantages.

It is another object of the present invention to provide a new and improved infant nursing bottle and luminescent indicator which may be easily and efficiently manufactured and marketed.

It is a further object of the present invention to provide a new and improved infant nursing bottle and luminescent indicator which is of a durable and reliable construction.

An even further object of the present invention is to provide a new and improved infant nursing bottle and luminescent indicator which is susceptible of a low cost of manufacture with regard to both materials and labor, and which accordingly is then susceptible of low prices of sale to the consuming public, thereby making such infant nursing bottles and luminescent indicators economically available to the buying public.

Still yet another object of the present invention is to provide a new and improved infant nursing bottle and luminescent indicator which provides in the apparatuses and methods of the prior art some of the advantages thereof, while simultaneously overcoming some of the disadvantages normally associated therewith.

Still another object of the present invention is to provide a new and improved infant nursing bottle and luminescent indicia&or for providing an individual with visual indication of remaining fluid within a nursing bottle during periods of limited light availability.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to &he accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in an assembled configuration.

FIG. 2 is an orthographic side view taken in elevation of the instant invention

FIG. 3 is an exploded isometric illustration of the instant invention.

FIG. 4 is an orthographic view taken in elevation of the outer shell of the apparatus FIG. 5 is a cross-sectional orthographic view of the outer shell of the apparatus.

FIG. 6 is an orthographic side view taken in elevation of the displacement vessel utilized by the instant invention.

FIG. 7 is an orthographic cross-sectional plan view of the displacement vessel of the instant invention taken through the first and second conduits thereof.

DESCRIPTION OF THE PREFERRED EMBODIMENT

With reference now to the drawings, and in particular to FIGS. 1 to 7 thereof, a new and improved infant nursing bottle and luminescent indicator embodying the principles and concepts of the present invention and generally designated by the reference numeral 10 will be described.

More specifically, the infant nursing bottle and luminescent indicator organization 10 essentially comprises a rigid outer shell 11 defined by a main cylindrical body portion 12 with an internally threaded cap 13 threadedly secured to a lowermost end of the main cylindrical body portion wherein the main cylindrical body portion 12 includes an upwardly tapered inwardly directed neck portion 14 coaxially arranged about the cylindrical body portion defining an upper edge 15 with an upper opening therethrough. The upper opening accepts a lid 17 with a nipple 18 for securement to a nursing bottle 16, wherein the nursing bottle 16 is of a predetermined length substantially equal to the axial length of the outer shell 11. The inwardly tapering neck portion 14 retains the nursing bottle 16 interiorly of the main cylindrical body portion captured between the interior surface of the neck portion 14 and the cap 13. Plural and parallel spaced first and second respective cylindrical chambers 19 and 20 are integrally mounted to interior surfaces of the main cylindrical body portion 12 and are diametrically opposed to on another and axially parallel to the main cylindrical body portion. The first and second cylindrical chambers 19 and 20 are defined by a respective first lower end 19a and a second lower end 20a defining an opening for reception of conduits, to be discussed below.

Spaced fluid indicator indicia portions 21 are mounted and arranged overlying and aligned with each respective first and second cylindrical chamber 19 and 20 and are spaced in convenient indicator portions, such as ounces, as illustrated in FIGS. 1 and 2 for example. It is understood that the outer shell 11 is formed of a transparent material, preferably polymeric but glass may be utilized. A lower edge 23 of the main cylindrical body portion 12 defines a lower opening of a diameter greater than the spacing between the first and second cylindrical chambers 19 and 20 is substantially equal to that diameter defined by the nursing bottle 16 to align and mount the nursing bottle is within the outer shell 11. The main cylindrical body portion includes a threaded lower end 22 for reception of the internally threaded cap 13 thereover.

A flexible, polymeric displacement vessel 24 includes a base pouch 25 formed of a generally elliptical configuration and of a memory retentent material. The length of the base portion 12 is substantially equal to that of the diameter of the main cylindrical body portion 12 and is positioned between the nursing bottle 16 and the cap 13 when the organization 10 is in an assembled configuration. The base pouch 25 is in fluid communication with diametrically opposed first and second conduits 26 and 27 of a length substantially equal to the respective lengths of the first and second chambers 19 and 20, with diameter substantially equal to that of the chambers 19 and 20 and are formed with a first conduit entrance 26a and a second conduit entrance 27a in fluid communication and aligned with the first and second conduits 26 and 27 respectively. The base pouch 25 and the first and second conduits 26 and 27 are formed of a flexible polymeric material and it is understood that surgical rubber may be utilized for its construction. A chemi-luminescent fluid 28 is provided within the base pouch 25 and is defined by a volume equal to the available volume of the base pouch 25 in alignment with the first and second conduit entrances 26a and 27a. Additionally, the numerals and letters 21a positioned by the indicia 21 can also be covered with a luminescent material to enhance readability under low lights conditions. Reference to FIG. 6 illustrates that when the nursing bottle 16 imparts pressure illustrated by the pressure arrows 29 upon an upper surface of the base pouch 25 captured between the nursing bottle 16 and the end cap 13 in use, the weight of the nursing bottle 16 and its contents will displace the chemi-luminescent fluid 28 through the first and second conduit entrances 26a and 27a into the first and second respective conduits 26 and 27 dependent upon the weight of the nursing bottle and its remaining nursing fluid therewithin along the movement of the fluid movement arrows 30, as illustrated in FIG. 6. It is understood that the empty nursing bottle 16 will not displace the chemi-luminescent fluid 28 appreciably through the first and second conduits 26 and 27, but upon the nursing bottle being full, it will displace the fluid substantially throughout the first and second conduits 26 and 27. The nursing bottle and the associated construction of the outer shell 11 and its organization may be configured to accommodate four ounce, eight ounce, or any arbitrary fluid number decided upon.

In use, it is understood that the luminescent fluid will be directed through the first and second conduits 26 and 27 and be visible through the fixed first and second cylindrical chambers 19 and 20 on either side of the outer shell 11 for visible ascertaining of remaining fluid within the nursing bottle 16 by an individual when nursing an infant without resorting to use of additional artificial light within a room.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by LETTERS PATENT of the United States is as follows:

1. An infant nursing bottle and luminescent fluid indicator apparatus comprising,
    a transparent outer shell defined by an internal configuration, and
    a nursing bottle defined by an external configuration substantially complementary to that defined by the internal configuration, and
    a displacement vessel with at least one conduit member positioned between the nursing bottle and the outer shell, and
    a chemi-luminescent fluid captured within the displacement vessel, and
    a cap member including means for securement to a lowermost end of the outer shell to capture the nursing bottle within the outer shell and to capture the displacement vessel between the cap member and the nursing bottle.

2. An infant nursing bottle and luminescent fluid indicator as set forth in claim 1 wherein the outer shell includes diametrically opposed series of fluid indicator indicia portions, and further includes first and second cylindrical chambers positioned interiorly and integrally mounted to interior surfaces of the outer shell diametrically opposed to one another and aligned with the indicator indicia portions, and the first and second cylindrical chambers including lower openings aligned with the lowermost edge of the outer shell.

3. An infant nursing bottle and luminescent fluid indicator apparatus as set forth in claim 2 wherein the displacement vessel includes a flexible, elliptical base pouch containing the chemi-luminescent fluid wherein the chemi-luminescent fluid is defined by a volume substantially equal to a predetermined volume defined by the base pouch in a first non-stressed configuration, and the at least one conduit member defines a first and second conduit member which are diametrically opposed and in fluid communication with the base pouch, the conduit members defined by a conduit configuration equal to an internal configuration defined by the first and second cylindrical chambers so as to be received by the first and second cylindrical chambers, respectively.

4. An infant nursing bottle and luminescent fluid indicator apparatus as set forth in claim 3 wherein the outer shell includes a tapered upper end to capture the nursing bottle internally thereof.

5. An infant nursing bottle and luminescent fluid indicator apparatus as set forth in claim 4 wherein the securement means shell includes a threaded lowermost exterior surface on the outer shell for receiving the cap member and internal threads on the cap member securable to the threaded lower end of the outer shell.

* * * * *